Dec. 27, 1949 — R. MIOLLIS — 2,492,878
METHOD OF PRESSING CHEESE
Original Filed Nov. 9, 1944 — 5 Sheets-Sheet 1
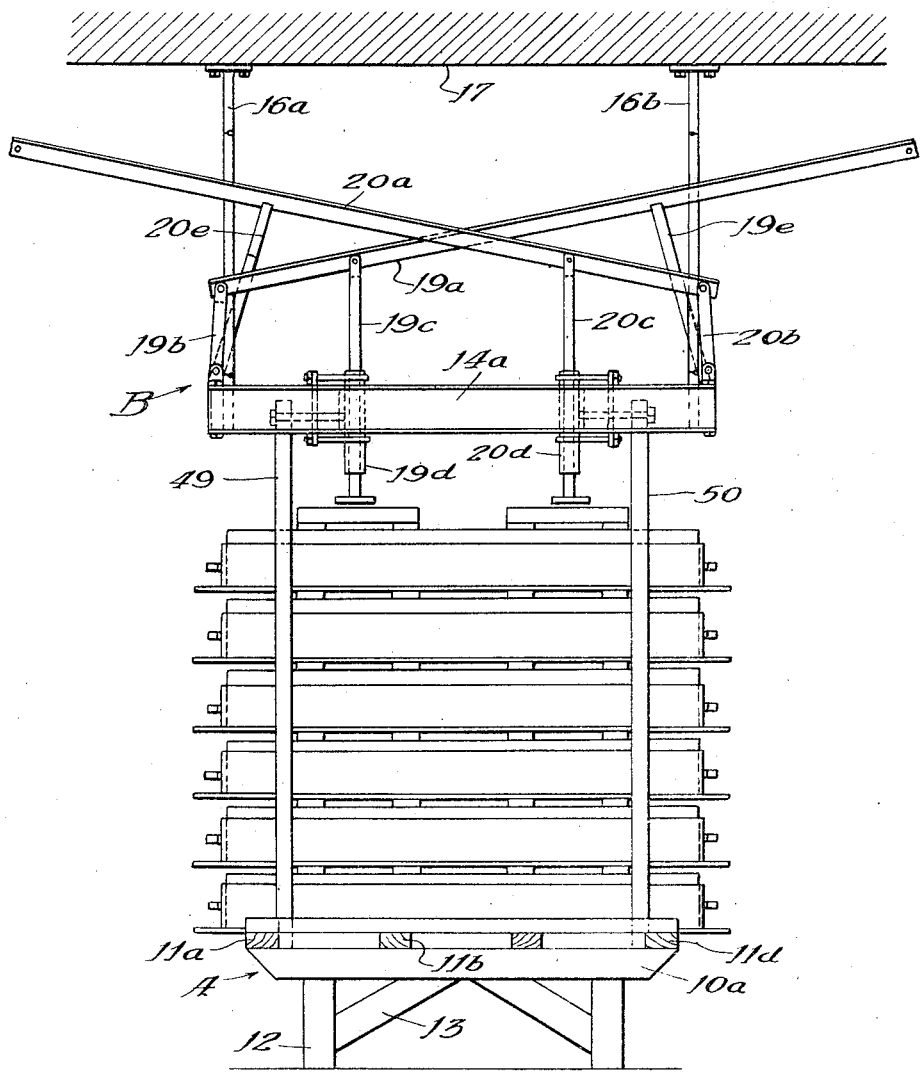
Inventor:
Raymond Miollis
By Christen, Schroeder,
Merriam & Hofgren,
Attorneys Dec. 27, 1949 R. MIOLLIS 2,492,878
METHOD OF PRESSING CHEESE
Original Filed Nov. 9, 1944 5 Sheets-Sheet 2
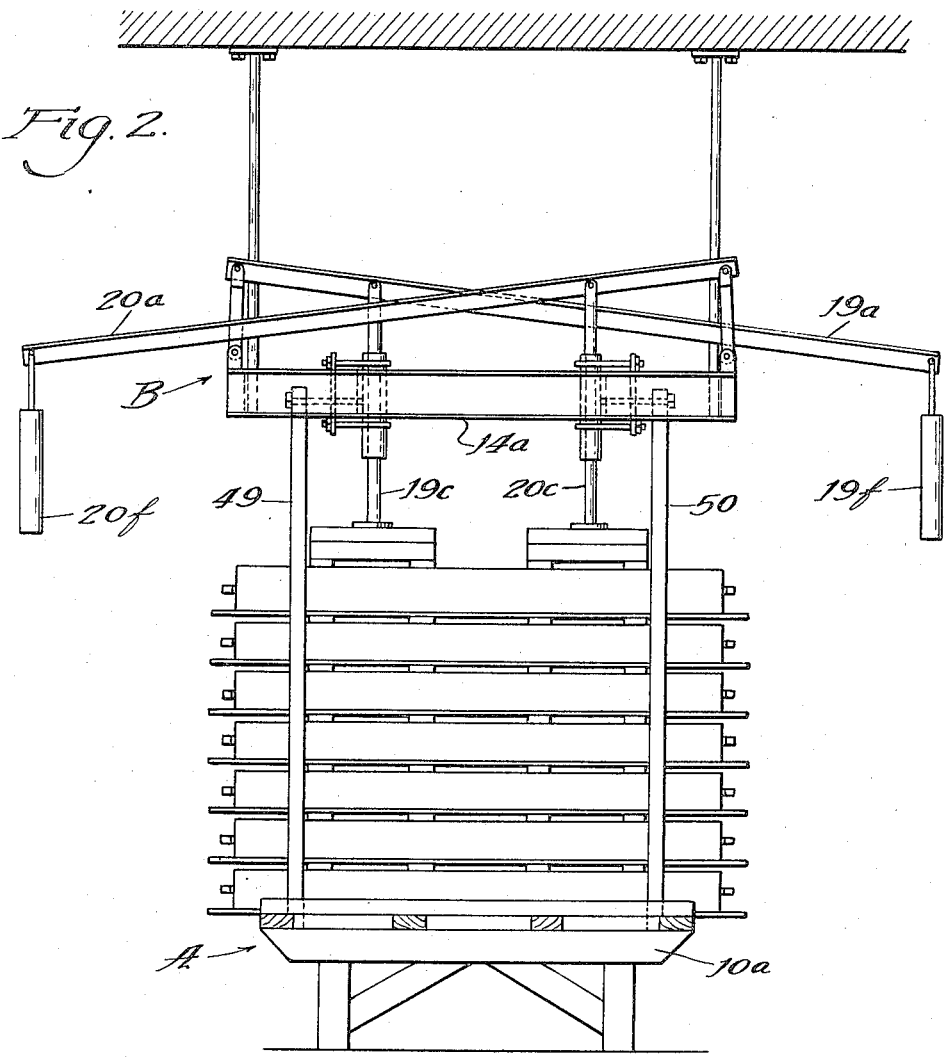
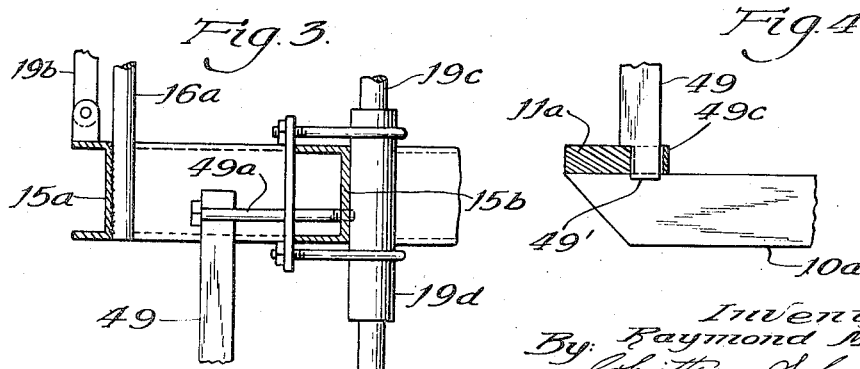
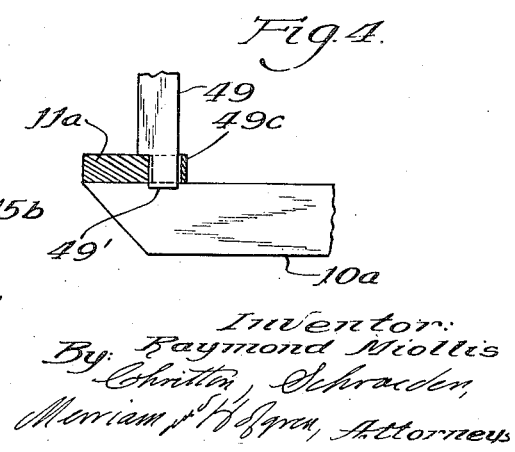

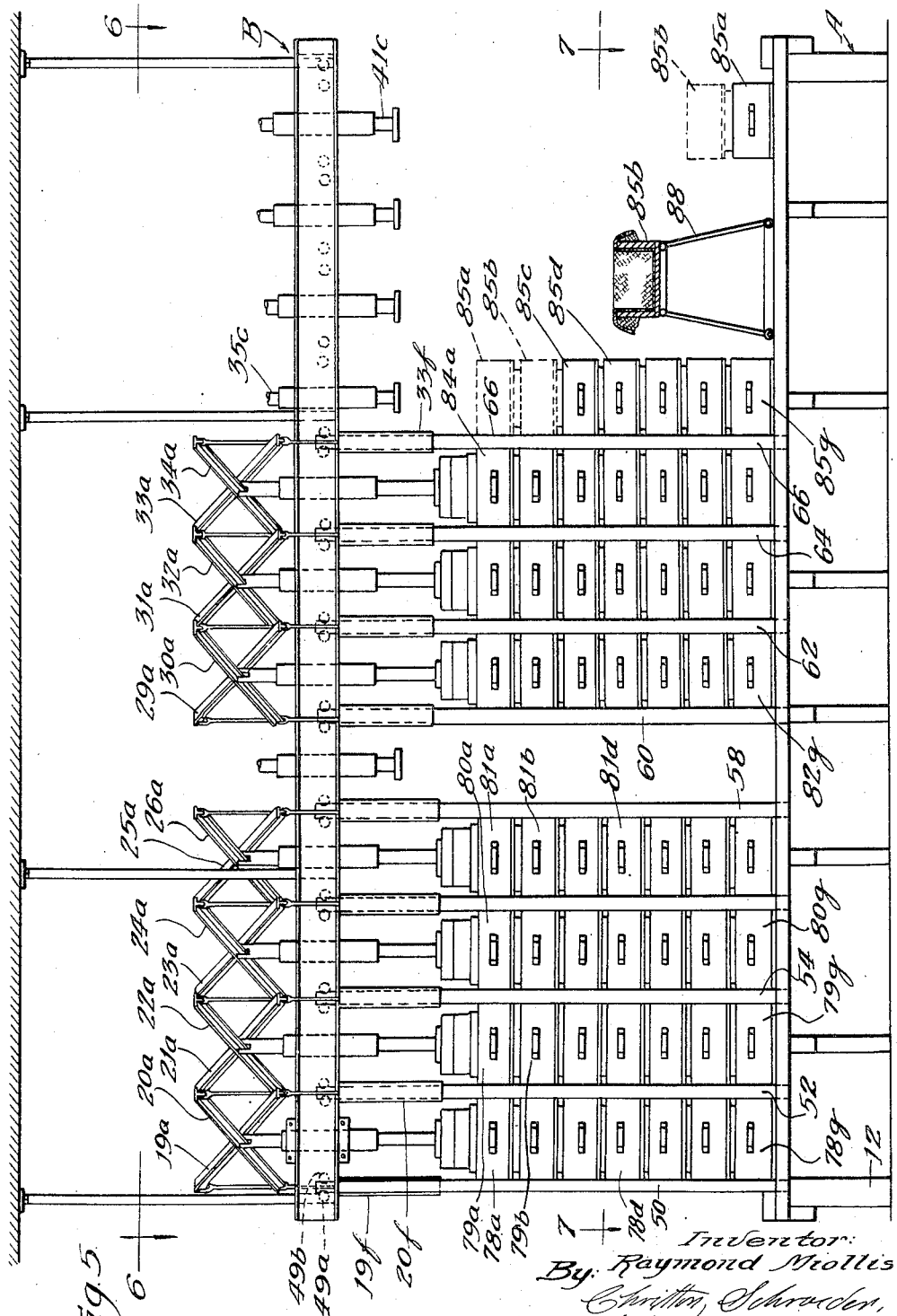

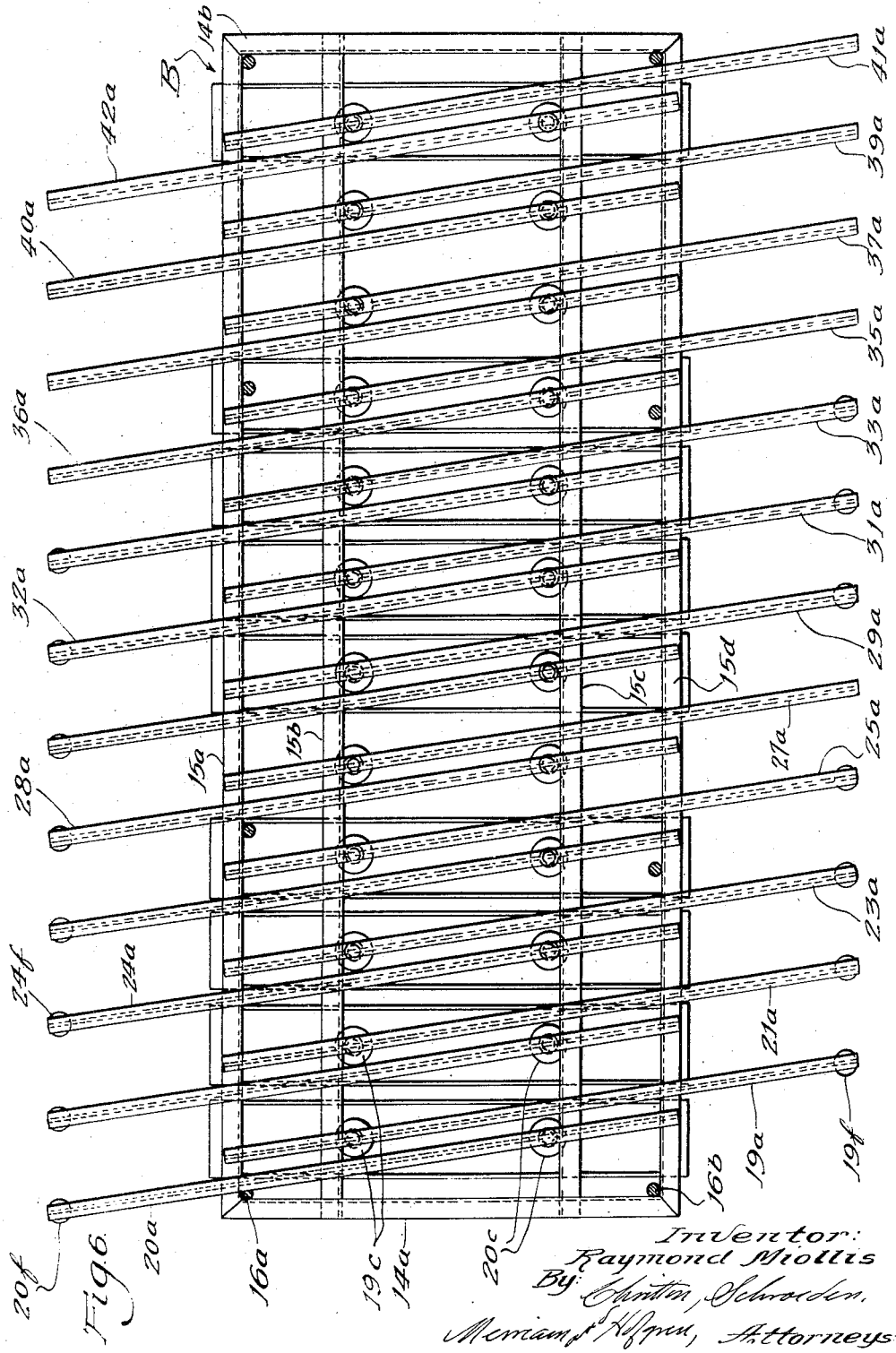

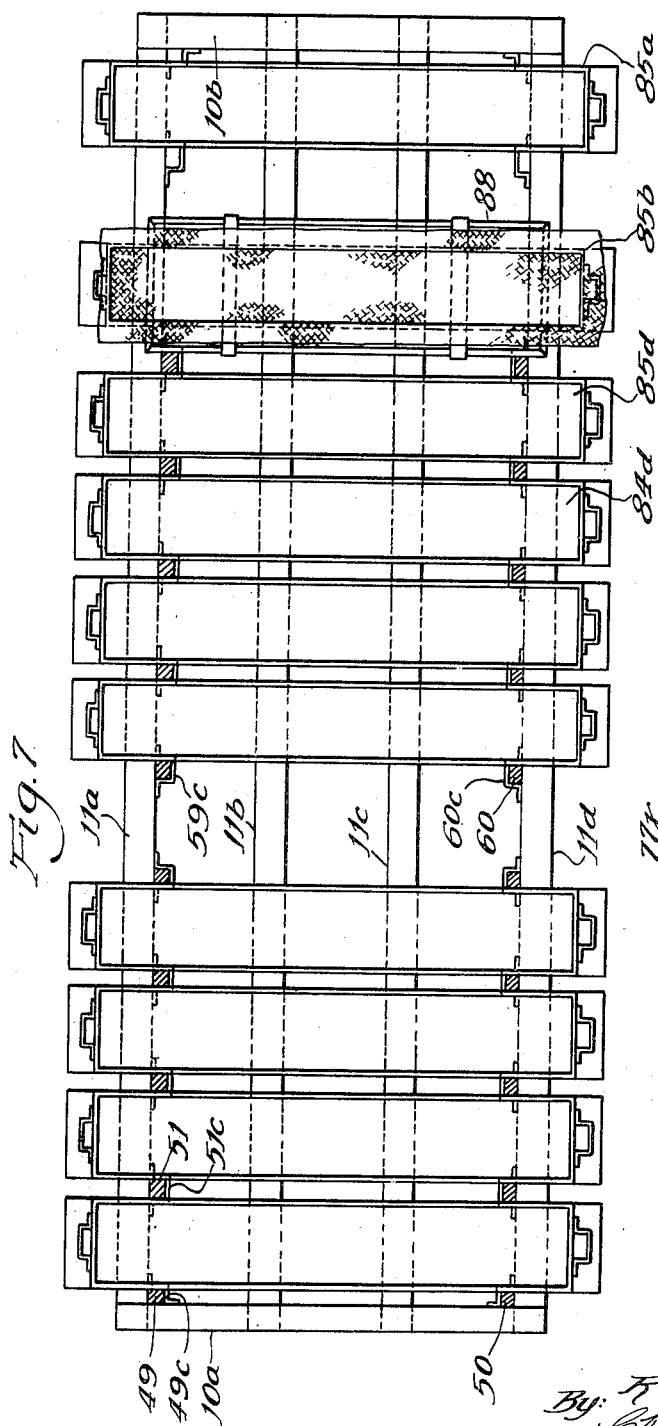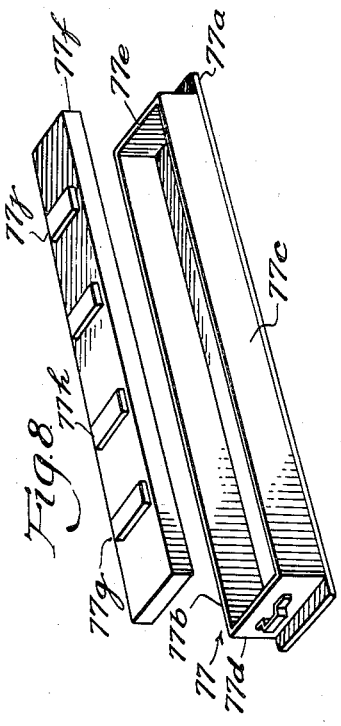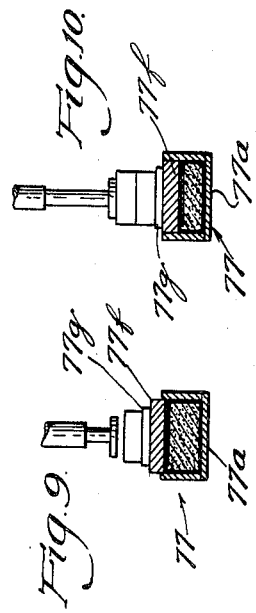

Patented Dec. 27, 1949

2,492,878

UNITED STATES PATENT OFFICE 2,492,878

METHOD OF PRESSING CHEESE

Raymond Miollis, Maywood, Ill.

Original application November 9, 1944, Serial No. 562,577. Divided and this application September 4, 1946, Serial No. 694,728

7 Claims. (Cl. 99—116)

This invention relates to a method of pressing cheese, and more particularly to a method of pressing facilitating the handling of long cheese forms.

This application is a division of my application Serial No. 562,577 filed November 9, 1944.

One feature of this invention is that it provides an improved method of handling cheese in forms on a cheese press; another feature of this invention is that the cheese forms may be very conveniently lifted on to and off of the press bed; still another feature of this invention is that the cheese forms and cheese therein may be readily and conveniently handled and worked upon between successive pressing; yet another feature of this invention is that various handling steps in the processing of the cheese being pressed, as inverting it, rewrapping it and the like, may all be conveniently performed without removal of the cheese or its form from the press; and yet a further feature of this invention is that my improved pressing methods permit what might be termed continuous movement of the cheese through the pressing stages, greatly speeding up this phase of cheese making and considerably reducing the labor costs heretofore associated therewith. Other features and advantages of this invention will be apparent from the following specification and the drawings in which:

Figure 1 is an end elevational view of a particular press embodying my invention, with the cheese forms in place but without pressure as yet being applied thereto, with only the end cheese pressing arrangement being shown; Figure 2 is a view similar to Figure 1, but with pressure being applied to the cheese; Figure 3 is a fragmentary enlarged detail view of a part of the upper portion of the press shown in Figure 2; Figure 4 is an enlarged fragmentary detail view of a part of the lower portion of the press shown in Figure 2; Figure 5 is a side elevational view of the press as shown in Figure 2; Figure 6 is a plan view of the press as shown in Figure 5, along the line 6—6 of such figure, particularly illustrating the arrangement of the pressing means; Figure 7 is a horizontal sectional view along the line 7—7 of Figure 5; Figure 8 is a perspective view of one cheese form with the cover and cleats shown spaced from their operative position with respect to the remainder of the form; Figure 9 is a fragmentary detail sectional view through a single form with the parts in position before pressure is applied; and Figure 10 is a view similar to Figure 9 but showing pressure being applied.

The present invention relates particularly to pressing methods used in making natural cheese adapted to be sold to the ultimate consumer in the form of relatively small packages, as distinguished from the so-called "processed cheese." In a process of the kind which I employ large batches of milk, as ten thousand pounds at a time, are coagulated into cheese which is pressed and cured in relatively large-size blocks which are then cut up into small loaves or pieces which may be only half a pound or a pound each. I have made a number of inventions in connection with apparatus and methods for making natural cheese and have had a number of patents issued to me thereon. One of my issued patents, No. 2,103,545 of December 28, 1937, gives a full description of a complete process of the kind in which the press here being disclosed may be used. Accordingly, only a very brief description will be given here of a representative process and set of apparatus for the complete cheese-making process, reference being made to the above patent to supplement the present disclosure in such regard.

The apparatus for the entire cheese-making process includes as its principal elements a cheese vat, a molding vat, cheese molds or forms, a cheese press, and curing, cutting and packaging arrangements. The cheese vat receives a substantial quantity of milk and certain additives, and these are then agitated and worked until cheese curd of the desired type is formed, whereupon a substantial proportion of the whey associated with such curd is drained. The cheese curd and residual whey associated therewith may then be transferred to a molding vat where the curd has substantially all of the remaining whey drained therefrom and where some initial pressing and compacting may be done to cause knitting of the curds. The partially knit cheese in the molding vat may be then cut into rectangular blocks of uniform size and substantial length, as extending the full width of the molding vat, and these blocks may then be pressed in the molds or forms and subjected to pressure in the press. During the pressing operation, as will become more apparent in the fuller description of the press and pressing methods, the cheese is subjected to certain handling between portions of the pressing procedure. After the pressing is completed the blocks are cured in appropriate manner, generally on shelves in a cellar of the proper humidity and temperature, with such brushing, turning, or the like as may be appropriate. After the cheese has been cured for a sufficient period, as for example thirty days or more, the block is cut into loaves or bricks of the desired size, and packaged. The foregoing description is intended to describe merely one complete process in which my improved press and pressing method may be used, so that the following description of the part of the complete process to which this application is particularly directed may be understood with reference to one complete cheese-making process. My improved pressing methods to which this application is directed, however, can be readily used in any type of cheese-making process where pressing is employed.

Cheese presses are of two general types, vertical and horizontal. The press shown in this application and that shown in my earlier Patent 2,103,545 is of the vertical type, this type having a number of advantages and being the most widely used commercially. In this type the cheese forms containing the cheese which requires further compacting by pressure are piled in vertical columns and pressure is applied to the top of the columns. All prior presses known to applicant have been structures with a base portion or press bottom on which the cheese is piled, an upper portion including mechanical or hydraulic means for applying pressure to the cheese, main supporting structure between these portions (in the form of four main corner posts) and intermediate guide bars or rods rigidly or permanently attached to the base and upper portions of the press. The cheese forms were piled in columns between these rigid guide means, so that application of pressure to the top of the column would not cause dislodgment of the cheeses from the desired vertical column relationship, as by buckling of the column in the middle, or the like. Some form of guide means is essential to maintain proper alignment of the forms during pressing of the cheese.

If cheese is to have good quality, however, the pressing cannot be performed in a single step or operation, but should comprise a plurality of successive pressing steps with certain handling operation of the cheese therebetween. The cheese may, for example, be initially pressed for one or two hours. Then the pressure may be removed, the cheese subjected to certain handling, and further pressed for another period, as overnight. The cheese may then be again subjected to certain handling and pressed for a further period, if desired, before being moved to the curing cellars. The handling intermediate pressing steps may involve inverting the cheese within its form (by removing the cheese block, turning it upside down and again replacing it in the same form), inverting the cheese in its position in the vertical column (the top cheese in a given column becoming the bottom cheese in the column in the next pressing operation and vice versa), and rewrapping of the cheese, or any one or any combination of these or other handling operations associated with the pressing steps in making cheese. Heretofore the cheese forms were removed from the press for these handling operations, between pressing steps, to a work table placed right along side the press or to a transfer cart. After the desired handling operations were performed the cheese forms had to be moved back to the press and repiled between the guide members for the next pressing operation. This is time consuming and involved a substantial proportion of the labor costs associated with cheese making.

I have developed a cheese press and a method of handling cheese thereon which greatly reduces the time and labor cost involved in handling cheese between pressing steps while retaining the desired high quality of the cheese. Briefly, the upper portion of my press is supported at at least one end and preferably at both ends by overhead supporting means rather than by standards or posts rising from the base portion; and the guide means for the cheese columns are so constructed and arranged as to be readily removable from the press. As a result, all or any desired portion of the press is adapted to provide completely free and unimpeded space for the handling of the cheese forms. With a press of the kind shown in the accompanying drawings, the cheese forms may be readily lifted on to one end of the press, directly over the end of the press by a man at each end of the form, with nothing to impede the operation. When a column of cheese forms has been provided in the desired location, the press provides guide means preventing dislodgment or buckling of the column during pressing, but this guide means may be moved out of the way at the end of the first pressing step so that the cheese may be handled and repiled rapidly and without a hindrance, right on the press, by workmen standing on each side of the press. Moreover, the cheese may go through successive pressing and handling stages upon successive portions of the press, so that new cheese may be continuously (at appropriate periods, of course) moved on to one end of the press and completely pressed cheese moved off the other end of the press.

In the particular embodiment of my invention illustrated in the accompanying drawings, a press is shown comprising a lower base or bottom portion A and an upper or top portion B. The base, as may be seen from reference to Figures 1 and 7, may comprise a bottom framework of transverse members 10a and 10b and longitudinal members 11a—d, supported at an appropriate height from the floor, as fifteen inches, by a supporting framework which may comprise legs 12 and braces 13. The lowermost cheese forms of each vertical column rest upon the longitudinal members 11a—d.

The upper portion B of the press is here shown (referring more particularly to Figures 1 and 6) as also comprising a rectangular frame, although preferably of metal in this case. This frame may comprise transverse members 14a and 14b and longitudinal members 15a—d. This framework carries the pressing means, here shown as mechanical, and the means for holding the upper ends of the guide members to be hereafter described; and the frame itself is carried by overhead supporting means here shown as rods 16a and 16b attached to the ceiling 17. While this overhead supporting means is here shown as an attachment to a ceiling of the room in which the press is used, it will be understood that my invention contemplates any kind of supporting means wherein the support for the upper portion does not rise directly from the base portion of the press, the term "overhead supporting means" being intended broadly enough to cover the use of vertical columns in the room sufficiently spaced from the bed of the press to permit men to work freely all around that bed, with an overhead horizontal beam carried by the columns and in turn carrying the upper portion B of the press, it being understood that such an arrangement would not be necessary unless the ceiling were incapable of supporting the strain imposed by hanging one or more press upper portions therefrom.

Referring now more particularly to Figure 1, the pressing means for a single vertical column of cheese forms, as that shown in Figure 1, comprises two parts designed to distribute the pressure uniformly across the length of the cheese forms. One part may comprise a lever member 19a having one end pivotally connected to the upper framework by a link 19b, and an intermediate portion pivotally connected to a presser rod 19c vertically slidable in a guide tube 19d rigidly mounted on the upper frame. The foot of the presser rod 19c is adapted to press against a block in turn resting on two cleats which deliver the pressure to the left-hand half of the cover of the top form, speaking with respect to the position of the parts as shown in Figure 1. The other half of the pressure means for the first column of cheese is identical but oppositely arranged on the upper frame, comprising the parts 20a—b operating to press the other end of this column. As may be best seen from Figures 5 and 6, the sets of presser arrangements 19-42 inclusive have their levers disposed at a slight angle, as fifteen or twenty degrees, to a line transverse of the press in order that the two presser rods of each set may lie in the same transverse plane. The pressing means are shown in inoperative position in Figure 1, with the free ends of the levers held up by any appropriate means, as the braces 19e and 20e. When it is desired to apply pressure to the cheeses these braces are removed and appropriate weights, as the weights 19f and 20f, hung on the outer ends of the levers. By pivoting the levers at the sides of the upper frame rather than in the center thereof, and by arranging the levers angularly in the manner best shown in Figure 6, the desired pressing leverage may be achieved without extending the ends of the levers inconveniently far beyond the sides of the upper frame.

Extending between the upper and lower portions of the press, and adapted to lie between adjacent columns of cheese forms to provide guide means therefor during pressing, are pairs of guide members, the members 49 and 50 being shown in Figures 1 and 2 and one each of certain succeeding pairs being best seen in Figure 5, these being identified as 50, 52, 54, etc. The particular guide members shown comprise 2 x 2 inch pieces of wood, and they are adapted to be related to the upper and lower portions of the press in such manner as to be very quickly and easily placed in or removed from operative guiding position. Inasmuch as all of the holding arrangements are duplicates, only the holding or attachment arrangement associated with the guide member 49 will be described, reference being had particularly to Figures 3 and 4. The upper end of the guide member 49 is adapted to be slipped between the body portions of two bolts 49a and 49b (see Figure 5 for the showing of the position of the latter) fastened in the upper frame member 15b. These bolts extend transversely of the press and are preferably so spaced that the distance between the parallel body portions of the bolts is just slightly over the width of the upper end of the guide member 49, so that the same may be slipped between the bolts 49a and 49b, the larger diameter of the heads of the bolts preventing the guide member from coming out between the ends thereof. The lower end of the guide member 49 is preferably provided with a reduced portion 49' adapted to be received within the socket provided by a strap metal socket member 49c nailed or otherwise permanently fastened to the bottom frame member 11a. The arrangement of successive guide members, and these lower holding socket members, may be well seen by reference to Figure 7. It will be readily apparent that the guide member 49 may be readily placed in position by sliding its upper end between the bolts 49a and 49b to a height greater than that shown in Figure 3, then swinging the lower end in until the reduced portion 49' is directly over the socket provided by the member 49c, and dropping it therein. Similarly, a guide member may be easily removed when desired merely by lifting up its lower end, swinging it out, and then dropping the whole guide member down until its upper end has pulled out from between the bolts designed to hold the upper end in operative position during pressing.

From the foregoing description of the base and upper portions of the press, the overhead support for the upper portion, and the guide members and their method of attachment, it will be readily apparent that the ends and any desired intermediate portion of the press can be readily cleared of guide members and will then provide a completely open space for unhindered handling of the cheese forms. On the other hand, when the forms have been piled in columns and are ready for pressing, the guide means may be quickly inserted and will then operate to hold the columns in the desired vertical alignment during the pressing operation.

Referring now more particularly to Figures 8, 9 and 10, a single representative cheese form or mold and the manner of pressing the cheese therein will be briefly described, this form being identified with a reference numeral different from that of any shown in Figures 1-7 and hereafter described. The form shown in Figures 8-10 and being identified in general as 77 comprises a bottom 77a, side members 77b and 77c, end members 77d and 77e (these latter being provided with handles for convenience in removing the forms) and a cover block 77f, the latter being adapted to be associated with cleats 77g—j. The side and end pieces are preferably formed in one unit and made removable from the bottom piece for convenience in sterilizing the forms at intervals, as explained more fully in my heretofore mentioned patent; and the top member 77f is a relatively thick piece adapted to telescope within the rectangular framework provided by the side and end members of the form, as shown in Figures 9 and 10. A block of partially knit cheese removed from the molding vat would be initially laid in the form, with cheese cloths therearound if desired, and then the top block 77f would be laid thereon. The cheese cloth would, as shown in Figures 9 and 10, have its ends folded across the top of the cheese block before the top member 77f was laid thereon. Figure 9 shows the parts with the cheese in the form and one block on top of the cleats, with no pressure as yet applied; while Figure 10 shows two blocks on top of the cleats and the position of the parts as they would be after some compacting of the cheese under pressure.

Referring now to Figures 1-7, it will be seen that the press is adapted to hold a large number of cheese forms analogous to that just described, in vertical columns here illustrated as comprising seven sets of forms and associated cleats in each column, although it will be understood that the number of forms in any column would depend upon the relative size of the forms as compared with the distance between the upper and lower portions of the press. In the particular press shown the forms are about ten inches wide by fifty-four inches long by six inches deep, speaking in terms of external dimensions. The first column of forms at the left-hand end of the press (speaking with respect to the position of the parts as shown in Figure 5) is here identified as 78a—g; the next column comprises the forms 79a—g; the next comprises the forms 80a—g, etc. While the amount of cheese made in a single batch and the number of forms in which it will be held during pressing would depend upon the proportions desired between the various apparatus, in the particular press being illustrated it may be assumed that one batch of cheese coagulated in the cheese vat and molded in the molding vat would be just held by the 24 forms comprising columns 78–81 inclusive, an earlier batch being just held by the next set of forms comprising the columns 82–85, inclusive. The ease of handling and the so-called "continuous" type of operation which may be performed on my press is best explained by assuming that two batches of cheese are in place on the press as illustrated in Figure 5. The left-hand batch will be just completing the first period of pressing after it has been brought on to the press from the molding vat. The cheese in the second group of forms, to the right, may be considered to have just completed its second period of pressing, and to have undergone an earlier period of pressing on the left-hand side of the press and an intermediate handling operation. The cheese in the second set of forms is now ready to undergo further handling and to be placed in position for its final pressing operation. The weights associated with the pressing means for the column 85 have been removed and the levers placed up so that this pressing means is inoperative. It is assumed that the top form 85a has been lifted off the pile, that its cheese has gone through any desired handling operations and been replaced therein, and this form 85a is shown as the bottom of a pile at the right-hand end of the press. The next form 85b is shown as having been removed from the column 85 and placed on a small handling table 88 having a bottom portion adapted to rest on the bed of the press and an upper portion lying at a convenient height for the workmen, as about waist high. The form 85b is placed thereon and the cover removed, whereupon the cheese block therein may be lifted out of the form, rewrapped if desired, and placed back therein upside down. The cover is then placed back in position and the form would be placed on top of the form 85a already shown in position on the right-hand column, with appropriate cleats between the cover of the form 85 and the bottom of the form 85b. These cleats, of course, are used to enable the cover member of the lower form to be pressed down further into its form than would otherwise be possible; and if the cover has already gone down into the form so deeply that one cleat is not sufficient to provide space between the top of the side walls of the lower form and the part of the form immediately above it, a second row of cleats is laid on top of the first row. In any event there is preferably half an inch to an inch space between each of the forms at the beginning of any pressing operation. The cheese is preferably inverted both within its own form and with respect to its relative position in the vertical columns between each pressing operation, although sometimes only one of these two inversions is used, the term "invert" being hereafter used, unless specifically qualified, in the broad sense to include either or both "turn-over" inversions or "top-to-bottom" inversions.

After the form 85b has been placed on the form 85a the form 85c would be picked up from the position shown in solid lines and placed on the handling table 88, where it would undergo the desired handling operations and then be placed on top of the form 85b. This operation would be continued until all of the forms in the row 85 were moved to the furthest right-hand end of the press and piled thereon, the form 85g becoming the top form. The guide members would then be placed in position to the right of this last column and immediately to the left thereof, the handling table 88 would be moved to the left the distance of one row, and the guide members 65 and 66 would be removed from the press. Then the column of forms 84 would be similarly worked upon, the cheeses therein being inverted, preferably also rewrapped, and a new column built up in the next to the last column to the right of the press. Guide members would be placed in position just in front of this column, the guide members 63 and 64 would be removed, and the next column handled and repiled. When this procedure was completed the columns of forms 82—85 would have undergone the desired handling intermediate pressing operations and would be stacked in the last four positions to the right of the press. Then blocks would be placed on top of the cleats on the uppermost forms of each of these columns and the pressing means rendered operative by removing the holding means therefor and hanging weights on the ends of the levers.

By this time the handling table 88 will be a row or two to the right of the column of forms 81. The guide members 57 and 58 would then be removed, the handling table placed just next to the column of forms 81 and this column handled and repiled, as for example in the position shown as occupied by the column of forms 84 in Figure 5. Succeeding columns would be handled and repiled so that the column 81 would be inverted, possibly also rewrapped, and in the position now occupied by the column of forms 84; the cheese in the column of forms 80 would be handled and repiled in the position now occupied by the forms of the column 83, etc., until all of the cheeses in the first group of forms had been handled and repiled. The pressing means would then be rendered operative to give this group of cheeses its second pressing operation.

Cheeses which had just been molded in the molding vat would then be wrapped and placed in another set of forms, not shown, and swung up over the end of the press and piled in columns in the positions shown as occupied by the columns 78—81, with guide members being placed between each column, of course. Inasmuch as the guide members are not in place when the new cheese forms are being brought on to the press, workmen at each end of the form can conveniently swing it up over the end of the press and run it down to the desired position in which it is to be piled. After the new set of forms has been properly piled, with guide means between each column, the pressing means would be rendered operative. The whole press might remain under pressure for an appropriate period, and the workmen would then remove the guide members and cheese forms from the right-hand end of the press, taking them to the curing cellars or to a salting vat prior to the curing cellars, these forms being readily swung off of the right-hand end of the press when the guide members are removed. After the forms holding this last batch of cheeses had been removed the handling table could be placed on the press and the set of cheeses then in the middle of the press inverted and repiled in the manner which has been described. Similarly, the cheeses at the left-hand end of the press would be inverted and repiled in the central portion. Then the empty forms would be filled with cheese blocks, as soon as they were ready in the molding tank, and placed on the left-hand end of the form. It will be readily apparent that my pressing apparatus and method provides the type of pressing and handling necessary for good quality natural cheese, while at the same time minimizing the pressing space required and very greatly reducing the time and labor cost involved in handling the cheese between pressing steps.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A method of handing cheese, including: putting the cheese of a batch in forms; piling these cheese forms in vertical columns on a portion of a cheese press; expressing whey from the cheese by applying pressure to the cheese in the forms in such columns for a certain period; moving the cheese forms from said columns and piling them in other vertical columns on another portion of the press, all without removing the cheese forms from the press; putting the cheese of a second batch in a second set of forms; piling these last mentioned cheese forms in vertical columns on the first mentioned portion of the press; and expressing whey from cheese in the second batch by applying pressure to the cheese in the forms in all the columns for a certain period.

2. A method of handling cheese, including: putting the cheese of a batch in forms; piling these forms in vertical columns on a portion of a cheese press; expressing whey from the cheese by applying pressure to the cheese in the forms in such columns for a certain period; inverting the cheese and piling the cheese forms in other vertical columns on another portion of the press, all without removing the cheese from the press; putting the cheese of a second batch in a second set of forms; piling these last mentioned cheese forms in vertical columns on the first mentioned portion of the press; and expressing whey from cheese in the second batch by applying pressure to the cheese in the forms in all the columns for a certain period.

3. A method of handling cheese, including: putting the cheese of a batch in forms; piling these cheese forms in vertical columns on a first portion of a cheese press; expressing whey from the cheese by applying pressure to the cheese in the forms in such columns for a certain period; inverting the cheese in each form and piling the cheese forms in other vertical columns on a second portion of the press, all without removing the cheese from the press; putting the cheese of a second batch in a second set of forms; piling these last mentioned cheese forms in vertical columns on the first mentioned portion of the press; expressing whey from all the cheese by applying pressure to the cheese in all the columns for a certain period; inverting the cheese in the forms on the second portion of the press and piling them on a third portion of the press, and inverting the cheese in the forms on the first portion of the press and piling them on the second portion, all without removing the cheese from the press; putting the cheese of a third batch in a third set of forms and piling these last mentioned forms in vertical columns on the first portion of the press; and expressing whey from all the cheese by applying pressure to the cheese in the forms in all the columns for a certain period.

4. A method of the character claimed in claim 3, wherein the cheeses are rewrapped during at least one of said inversions.

5. A method of the character claimed in claim 1, wherein the forms are moved between pressing position on the press and another stage in the manufacture of the cheese by lifting said forms over one end of the press.

6. A method of the character claimed in claim 1, wherein the cheese forms are quite long and adapted to lie transversely on a rectangular vertical press, and wherein forms are moved onto the press and between various positions on the press by force simultaneously but independently applied to each end of the form being moved.

7. A method of the character claimed in claim 1, wherein the forms are relatively quite long and adapted to lie transversely on a rectangular press, and wherein the forms are moved by force simultaneously but independently applied to each end thereof.

RAYMOND MIOLLIS.

REFERENCES CITED

The following references are of record in the file of this patent:

UNITED STATES PATENTS

| Number | Name | Date |
| --- | --- | --- |
| Re. 21,834 | Miollis | June 17, 1941 |

OTHER REFERENCES

Bulletin 608, U. S. Dept. of Agriculture, published by Govt. Printing Office, Washington, D. C., Mar. 6, 1918, pages 6 (Box), 19, 20 (Emmental).

Bulletin 165, U. S. Dept. of Agriculture, published by Govt. Printing Office, Washington, D. C., June 30, 1913, page 50 (Cheddar).